INVENTOR
ROBERT L. WYCKOFF
BY Carole M. Colman
ATTORNEY

United States Patent Office 3,418,574
Patented Dec. 24, 1968

3,418,574
SPECTRUM ANALYZER USING LIMITED OPERATING FREQUENCY BANDWIDTH
Robert L. Wyckoff, Marlboro, Mass., assignor to Raytheon Company, Lexington, Mass., a corporation of Delaware
Filed Jan. 28, 1966, Ser. No. 523,628
5 Claims. (Cl. 324—77)

ABSTRACT OF THE DISCLOSURE

A spectrum analyzer using a limited operating frequency bandwidth by virtue of increasing the processing time. For any given successive input signals narrow frequency samples are taken. A first coherent memory filter responsive to the successive applied input signals recirculates the signals and produces a plurality of frequency shifted signals corresponding to the number of recirculations. The shifted signals are distributed upon corresponding transmission paths in which they are reshifted to their original frequency and further made to establish a predetermined phase relation on the different paths. The reshifted signals are then summed and applied to a second coherent memory filter for producing an output spectrum analysis.

This invention is concerned with a spectrum analyzer for scanning a band of signal frequencies in order to determine the frequency spectrum of any signal appearing in the frequency band scanned.

In many applications, such as in radar, it is often desirable to perform a real-time, fine resolution, spectrum analysis of input signals. A particularly suitable device for accomplishing this analysis is a coherent memory filter, which is also called a circulating memory integrator. The coherent memory filter is an active time-variable network, responsive to any arbitrary input signal, for generating an output signal that is a close approximation of the frequency spectrum of the input signal.

Generally, a coherent memory filter comprises a vectorial adder circuit, a frequency shifting circuit, and a time delay circuit connected in a closed loop. The frequency shifting circuit shifts the frequency of an applied signal, up or down, by a fixed amount each time it circulates through the loop. The shifted signal is then applied to a time delay circuit where it is delayed by a fixed amount each time it circulates through the loop. The vectorial adder circuit continuously adds the input signal to the shifted and delayed output signal of the time delay circuit. The output of the coherent memory filter comprises the vectorially added signals generated by the adder circuit. Such an output signal is equivalent to that which is obtained by passing the input signal through a frequency scanning or swept comb filter, and when it is displayed on suitable amplitude versus time display apparatus, it appears as a signal having peak amplitudes spaced apart in time and corresponding to the frequency content of the input signal.

A primary problem with prior art coherent memory filters is their excessive bandwidth requirements. Hence, the apparatus needed by them is difficult, if not impossible, to obtain. Furthermore, because of the large number of loop recirculations required to obtain the desired output signal, there is a critical need for loop gain stability.

In a preferred embodiment thereof, this invention trades bandwidth for time by stretching the signal processing in such a way that the same signal output is generated as is produced by a simple coherent memory filter, but it is framed by a multiplicity of intervals instead of just one interval. The inventive compound coherent memory filter comprises a first means operating as a tapped delay line for providing selected portions of the input signal waveform to an adder circuit where they are summed, and a second means including a simple coherent memory filter having a longer delay time, hence a longer readout period and lower bandwidth requirement than that of the prior art. The first means includes a first simple coherent memory filter operative to recirculate an integral number of times and including a first adder circuit connected in a recirculating loop with a first modulator and a first delay circuit having a predetermined delay time, a first source for applying a first modulating signal to said first modulator that includes an offset frequency signal, a plurality of bandpass filters each passing a different signal after a different number of recirculations in the recirculation loop, and a plurality of modulators responsive to signals from a harmonic generator for removing the offset frequency from the filtered signals. A second adder circuit then sums the filtered signals before applying the sum signal to a second simple coherent memory filter which is operative to recirculate a number of times substantially equal to the number of recirculations performed by a prior art device divided by said integral, and including a third adder circuit connected in a recirculating loop with a second modulator and a second delay line having a length substantially equal to said integral times said first delay time, and a second source for providing a modulating signal to said second modulator having a value substantially equal to the first modulating signal minus the offset signal times said integral. Because less loop recirculations are utilized than in the prior art, less critical loop gain stability is required.

Other objects, features, and embodiments of the invention will become apparent from the following description of a preferred embodiment taken in conjunction with the accompanying drawings in which.

Figure 1:
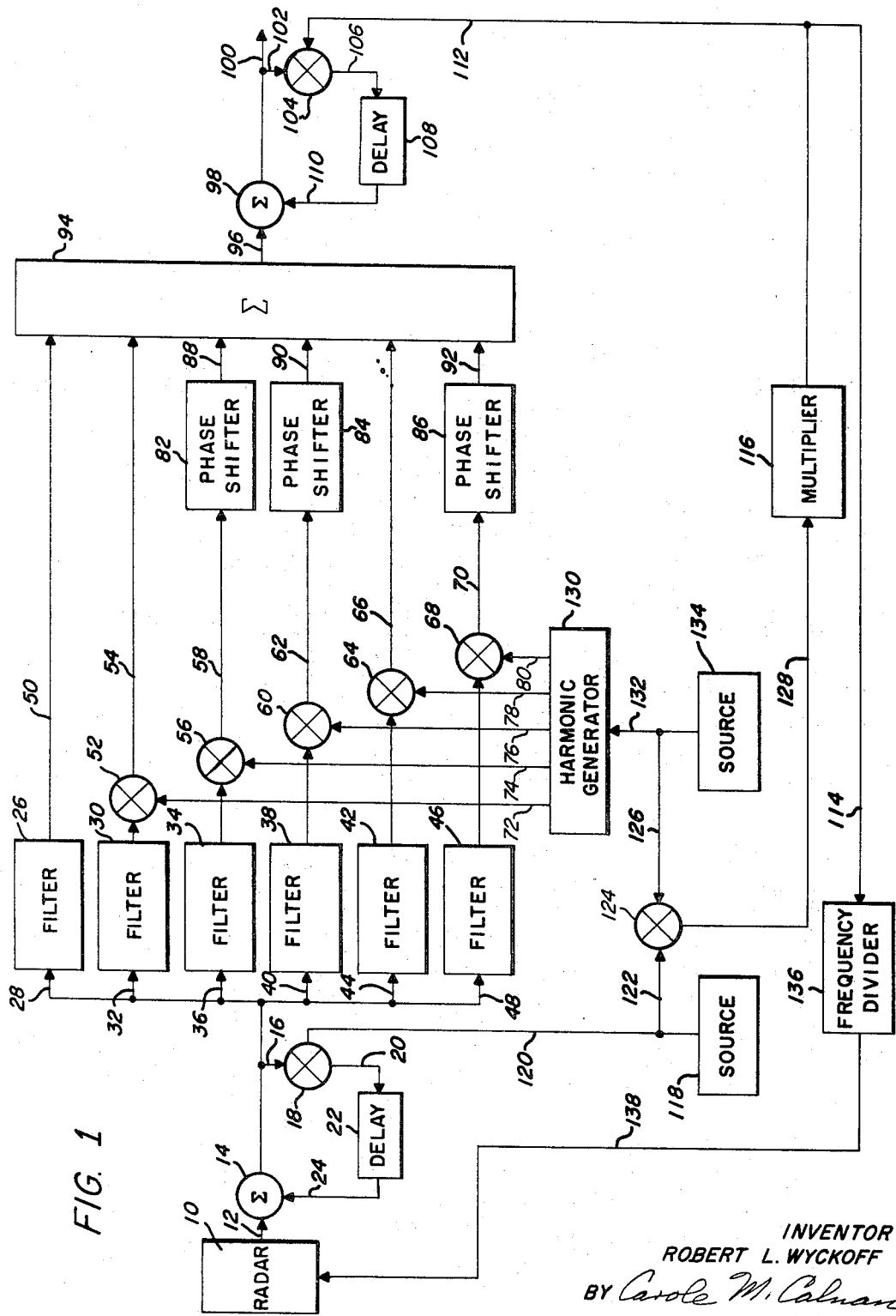
FIG. 1 is a block diagram of a preferred embodiment of the invention.

FIG. 1 depicts a radar system 10 applying echo signals to the inventive compound coherent memory filter for spectrum analysis, which comprises adder circuit 14 connected in a recirculating loop with modulator 18 and delay circuit 22; a plurality of filters 26, 30, 34, 38, 42, and 46 connected to the output of adder 14; harmonic generator 130 connected to modulators 52, 56, 60, 64, and 68; adder circuit 94 connected to filter 26, modulator 52, phase shifter 82, phase shifter 84, modulator 64, and phase shifter 86; adder circuit 98 connected to adder circuit 94 and in a recirculating loop with modulator 104 and delay circuit 108; modulator 124 connected to modulator 18, sources 118 and 134, harmonic generator 130, and multiplier 116 that is also connected to modulator 104; and, frequency divider 136 connected between radar 10, and multiplier 116 and modulator 104.

Radar system 10 may comprise any of the well-known systems and for purposes of explaining this invention has a pulse repetition frequency of 1218 c.p.s., a pulse width of 6 μsec., a center frequency of 20 mcs., and is fully coherent from pulse to pulse. As was mentioned previously, a prior art coherent memory filter would comprise apparatus such as adder circuit 14 connected in a recirculating loop with modulator 18 and delay circuit 22. Assume a fairly long coherent observation interval of 0.3 sec. so that the fine points of the spectrum can be suitably observed. Let modulator 18 receive a modulating signal of 182.7 kc. via line 120, and delay circuit 22 provide a delay of 821 μsec. Such a prior art coherent memory filter would require 365 circulations and have a bandwidth of 67 mc. Consequently, critical loop gain stability and excessive bandwidth are required.

In the foregoing example of a prior art coherent memory filter, the entire signal output is framed in an 821 µsec. interval. The inventive compound coherent memory filter shown in FIG. 1 stretches the signal processing in such a way that the same signal output is framed by a multiplicity of consecutive 821 µsec. intervals. In the following description of a preferred embodiment, a factor of 6 is used to stretch the output frame time to 6×821 or 4926 µsec., hence reducing the output bandwidth to a more tractable 11 mc. in a manner which will be explained below in detail.

Referring again to the preferred embodiment of the invention that is depicted in FIG. 1, radar 10 is capable of generating 151 intermediate-frequency signals in succession, where each corresponds to a different range interval of 5.44 µsec. Frequency divider 136 is a countdown frequency divider for dividing the signal output of radar 10 by 151, which was chosen because it is an odd number that is not divisible by 6. Accordingly, the time at which signal is produced on line 12 depends upon the length of time between the generation of a radar pulse and the receipt of the corresponding echo signal.

The circuitry comprising adder circuit 14, modulator 18, and delay circuit 22 operates in a manner similar to a simple coherent memory filter but provides only six recirculations. Source 118 provides a 3.03065 mc. modulating signal to modulator 18 via line 120, the 30.65 kc. portion thereof being chosen so that the input signal goes through only 60° of phase change in a 5.44 µsec. interval whereas the corresponding modulation of the prior art filter provides a 360° phase change. Here, then, is where the stretching factor of six is first introduced. Delay circuit 22 delays an input signal by 821 µsec. Hence, a signal applied to line 12 by radar system 10 is added to any recirculating signal on line 24 by adder circuit 14. The sum of these signals is then applied to modulator 18 and to filters 26, 30, 34, 38, 42, and 46. Modulator 18 modulates the sum signal with a signal from source 118 in order to shift its frequency and then applies the frequency shifted sum signal to delay circuit 22 where it is delayed before being applied to adder circuit 14. Thus, any signal received on line 24 includes all of the signals that were previously applied to adder circuit 14 by radar system 10.

As was mentioned previously, source 118 applies a 3.03065 mc. signal to modulator 18, 3 mc. of which is included in order to separate superimposed signals from adder circuit 14 in filters 26, 30, 34, 38, 42, and 46. Filter 26 is a band-pass filter having a center frequency of 20 mc. which is also the center frequency of a signal generated by radar system 10. Consequently, filter 26 passes a signal received on its input line 28 from adder 14, which does not include any recirculated signals from delay circuit 22. Similarly, filter circuits 30, 34, 38, 42, and 46 are band-pass filter circuits having center frequencies of 23, 26, 29, 32, and 35 mc., respectively, Hence, filter circuit 30 passes the output signal of adder circuit 14 after one complete loop recirculation; filter 34 after two loop recirculations; filter 38 after three loop recirculations; filter 42 after four loop recirculations; and, filter 46 after five loop recirculations.

Since the purpose of shifting the recirculating signal in modulator 18 by an additional 3 mc. is merely so that the output signals from adder circuit 14 can be separated in filters 26, 30, 34, 38, 42, and 46, this frequency offset is then subtracted in modulators 52, 56, 60, 64, and 68. Source 134 applies a 3 mc. signal to harmonic generator 130 via line 132. Harmonic generator 130 in response thereto then transfers a 3 mc. signal to modulator 52 by way of line 72; a 6 mc. signal to modulator 56 by way of line 74; a 9 mc. signal to modulator 60 by way of line 76; a 12 mc. signal to modulator 64 by way of line 78; and, a 15 mc. signal to modulator 68 by way of line 80. Each modulator 52, 56, 60, 64, and 68 shifts the frequency of its input signal back by the amount of frequency received from harmonic generator 130. Accordingly, the nominal center frequency of a signal generated on each one of lines 54, 58, 62, 66, and 70 is 20 mc.

Three phase shifters 82, 84, and 86 are shown in FIG. 1 preceding the second adder circuit 94. The fixed phase corrections provided by these devices 82, 84, and 86 are necessary in order to cause the output waveforms on line 100 to emerge in the well-known coherent memory filter form. Thus, phase shifter 82 provides a 60° phase shift; phase shifter 84 provides a 180° phase shift; and, phase shifter 86 provides a 240° phase shift. Adder circuit 94 sums the six signals on lines 50, 54, 88, 90, 66, and 92 and then applies the sum signal to input 96 of adder circuit 98 for further processing.

Source 118 applies a 3.03065 mc. signal to modulator 124 via line 122, and source 134 applies a 3 mc. signal to it via line 126. Modulator 124 therefore generates a signal having a value of 30.65 kc. on line 128 which corresponds to the difference between these two input signals. Multiplier 116 then multiplies the 30.65 kc. signal by six and transfers a 183.9 kc. signal to modulator 104 via line 112 and frequency divider 136 via line 114.

The circuit comprising adder circuit 98, modulator 104, and delay circuit 108 operates in a manner similar to a second simple coherent memory filter, which recirculates sixty-one times. Delay circuit 108 provides a delay of 4926 µsec. of six times that of delay circuit 22. Adder circuit 98 sums the signals on lines 96 and 110, and transfers the resulting sum signal to both output line 100 and to modulator 104 via line 102. Modulator 104 then shifts the sum signal by 183.9 kc. and applies the shifted signal to line 106. Delay circuit 108 delays the shifted signal before applying it to input line 110 of adder circuit 98. This addition and recirculation action continues sixty-one times.

Figure 2:
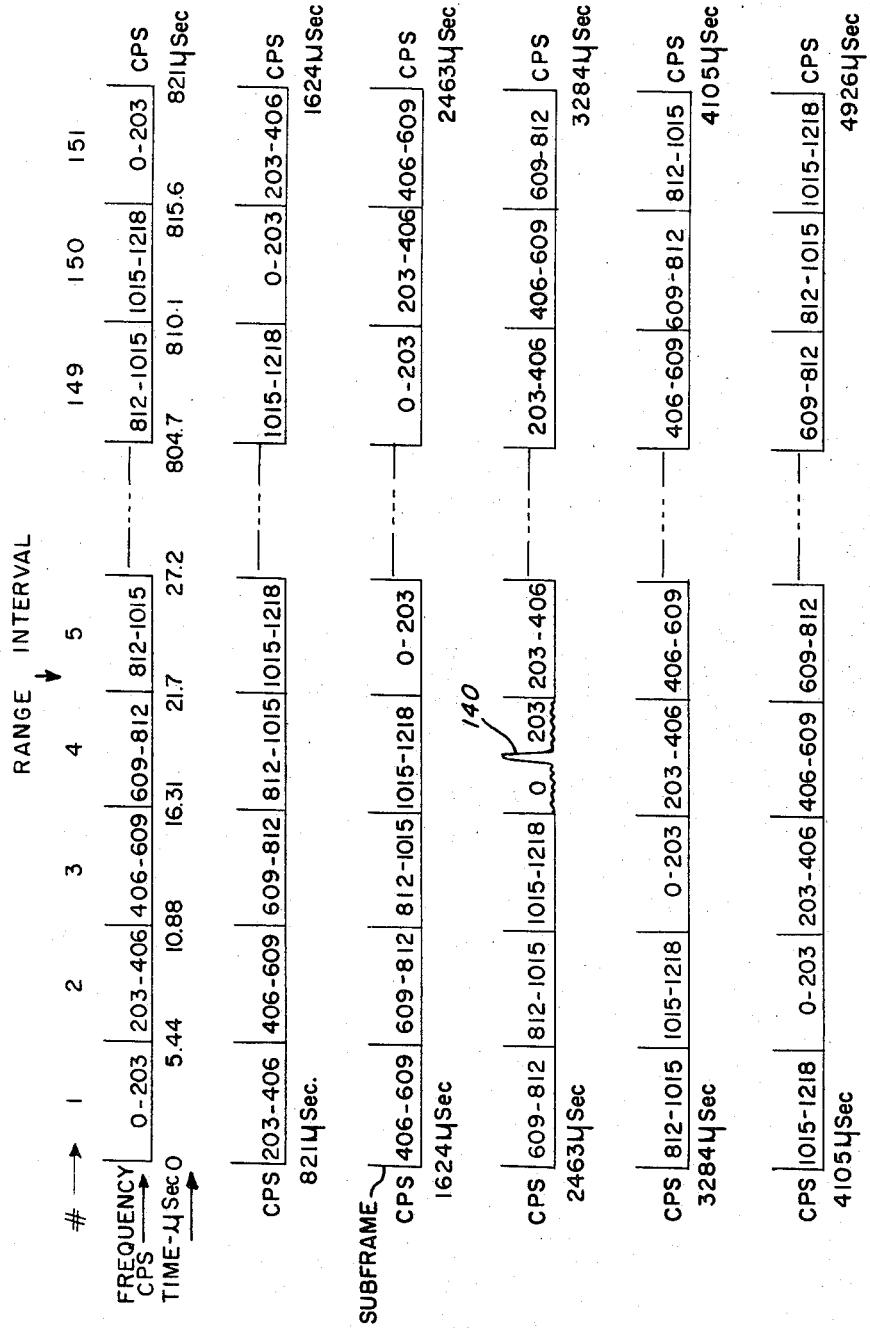
FIG. 2 is a schematic diagram showing a suitable manner for displaying the output signals in an integral number of subframes.

As was mentioned previously, a range interval has a time value of 5.44 µsec. The total phase modulation of the invention, however, is only one-sixth the amount that would be provided by the simple coherent memory filter of the prior art. Thus the resulting wavefore produced on line 100 in any 5.44 µsec. period is only one-sixth of the total frequency spectrum for the corresponding range interval. Refer now to FIG. 2 which is a schematic diagram showing a suitable manner for displaying the output signals generated on line 100 in six subframes, each having a length of 821 µsec. The entire frequency spectrum of each range interval appears in the corresponding portions of six subframes. Consequently, the entire spectrum of range interval 1 would be found by examining the left-hand vertical column, labelled range interval 1. In a similar manner the entire spectrum of the other range intervals 2–151 are represented.

The reason for selecting 151 range intervals, which is an odd number that is not divisible by six, is to cause the phase of the difference signal on line 128 to precess 60° every 821 µsec. so that after 4926 µsec. the complete spectrum of every range interval appears in the six subframes of the final 4926 µsec. output frame. Note, for example, the manner in which the 0 to 203 c.p.s. frequency range precesses by one subframe in succeeding range intervals.

The inventive compound coherent memory filter is useful in obtaining target range and Doppler information. Each echo received from a target by radar 10 would be delayed in time from the emission of the radar pulse by an amount corresponding to target range and would have a Doppler frequency shift. In response to this echo, the invention would produce a peak signal in the range interval corresponding to this delay and within the frequency interval corresponding to the Doppler shift. Thus, an intermediate-frequency signal on line 12 which is delayed by 18 µsec. and was Doppler shifted by 80 c.p.s. would appear as the peak signal 140 shown in FIG. 2.

What is claimed is:

1. A spectrum analyzer using limited operating frequency bandwidth comprising:
   a first coherent memory filter responsive to successive applied signals for recirculating the signals and producing a plurality of frequency shifted signals corresponding to the number of recirculations;
   a plurality of transmission paths;
   means for distributing the shifted signals upon corresponding paths according to the number of recirculations, for reshifting the signals to their original frequencies, and for establishing a predetermined phase relation between the reshifted signals on different paths;
   means for summing the reshifted signals; and
   a second coherent memory filter responsive to the summed signals for producing a spectrum analysis thereof.

2. A spectrum analyzer using limited operating frequency bandwidth comprising:
   a first coherent memory filter responsive to successive applied signals for recirculating the signals and for monotonically increasing the frequency contents of the signals $n-1$ times in $n$ recirculations;
   $n$ transmission paths;
   $n$ filters coupling the first coherent memory filter to corresponding transmission paths, each filter being tuned to pass frequency shifted signals corresponding to a unique recirculation;
   means for reshifting the path signals to their original frequencies and for establishing a predetermined phase relation between reshifted signals on different paths;
   means for summing the reshifted signals; and
   a second coherent memory filter responsive to the summed reshifted signals for producing a spectrum analysis thereof.

3. A spectrum analyzer using limited operating frequency bandwidth comprising:
   a first coherent memory filter responsive to successive applied pulse trains, each pulse of the train having a pulse width $T_1$, a frequency content of $f_1$ cycles per second, a pulse repetition period $T_2$ where $T_1 \ll T_2$, the first coherent memory filter including means for recirculating the pulses in the period $T_2$ and for frequency shifting each pulse frequency contents $f_1$ by an amount $\Delta f$ cycles per second such that the frequency contents in time period $nT_2$ seconds approximates $f_1 + n\Delta f$ cycles per second where $n$ is the number of the recirculation;
   $n$ transmission paths;
   $n$ filters coupling the first coherent memory filter to corresponding paths, each filter having a non-overlapping frequency pass band tuned to a unique center frequency $f_1 + (n-1)\Delta f$;
   means for reshifting the frequency contents of the pulses to their original frequencies and for establishing a predetermined phase relation between the reshifted frequency pulses on different paths;
   means for summing the reshifted pulses; and
   a second coherent memory filter responsive to the summed pulses for producing a spectrum analysis thereof.

4. A spectrum analyzer according to claim 3, characterized in that the means for summing includes means for terminating each of the paths and means for providing an amplitude magnitude sum output.

5. A spectrum analyzer according to claim 3, characterized in that the second coherent memory filter includes a delay element in a recirculation loop defining a time substantially equal to $nT_2$ seconds.

References Cited

UNITED STATES PATENTS 3,013,209   12/1961   Bickel et al.
3,086,172   4/1963    Johnson.
3,321,759   5/1967    Freedman.

OTHER REFERENCES

Gill: "A Versatile Method for Short-Term Spectrum Analysis in 'Real Time,'" Nature, Jan. 14, 1961, pp. 117–119.

RUDOLPH V. ROLINEC, *Primary Examiner.*

P. F. WILLE, *Assistant Examiner.*